(12) United States Patent
Maruo et al.

(10) Patent No.: US 8,217,758 B2
(45) Date of Patent: Jul. 10, 2012

(54) INFORMATION PROCESSING APPARATUS, METHOD, AND PROGRAM

(75) Inventors: Osamu Maruo, Tokyo (JP); Kentaro Onoe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 800 days.

(21) Appl. No.: 12/307,753

(22) PCT Filed: Mar. 28, 2008

(86) PCT No.: PCT/JP2008/056821
§ 371 (c)(1),
(2), (4) Date: Jan. 7, 2009

(87) PCT Pub. No.: WO2008/149599
PCT Pub. Date: Dec. 11, 2008

(65) Prior Publication Data
US 2009/0207002 A1     Aug. 20, 2009

(30) Foreign Application Priority Data

Jun. 7, 2007   (JP) .................................. 2007-151942

(51) Int. Cl.
   *H04Q 5/22*        (2006.01)
(52) U.S. Cl. ...................................... 340/10.1; 340/10.5
(58) Field of Classification Search .................. None
   See application file for complete search history.

(56) References Cited

U.S. PATENT DOCUMENTS

| | | | | |
|---|---|---|---|---|
| 6,563,882 B1 * | 5/2003 | Amtmann | ...................... | 375/295 |
| 7,273,165 B2 * | 9/2007 | Satake et al. | ................... | 235/375 |
| 7,274,286 B2 * | 9/2007 | Tagato | ....................... | 340/10.52 |
| 7,304,579 B2 * | 12/2007 | Diorio et al. | ................ | 340/572.4 |
| 2005/0099269 A1 * | 5/2005 | Diorio et al. | ................ | 340/10.51 |
| 2006/0049250 A1 * | 3/2006 | Sullivan | ......................... | 235/385 |
| 2006/0202800 A1 * | 9/2006 | Ohashi et al. | ................ | 340/10.1 |
| 2006/0273911 A1 * | 12/2006 | Nakagawa | .................. | 340/572.7 |
| 2007/0014615 A1 * | 1/2007 | Kasayama et al. | .............. | 400/76 |
| 2008/0231419 A1 * | 9/2008 | Mizukawa et al. | ........... | 340/10.1 |

FOREIGN PATENT DOCUMENTS

| | | | |
|---|---|---|---|
| JP | 2001 266077 | | 9/2001 |
| JP | 2003 140548 | | 5/2003 |
| JP | 2003-140548 | * | 5/2003 |
| JP | 2003 150909 | | 5/2003 |
| JP | 2003 208573 | | 7/2003 |
| JP | 2004 82432 | | 3/2004 |
| JP | 2004-240861 A | | 8/2004 |
| JP | 2005-225043 | * | 8/2005 |
| JP | 2005 225043 | | 8/2005 |
| JP | 2005 225101 | | 8/2005 |

* cited by examiner

*Primary Examiner* — Jennifer Mehmood
*Assistant Examiner* — Brian Wilson
(74) *Attorney, Agent, or Firm* — Oblon, Spivak, McClelland, Maier & Neustadt, L.L.P.

(57) ABSTRACT

In an information processing apparatus in which a sheet having an RFID tag is transported, the transport speed is changed or the sheet is stopped to enable data to be communicated to or from the RFID tag without the need for setting a fixed speed in advance. Common communication standards are identified between the RFID tag and an RFID reader/writer, and common communication speeds are identified. Among the common communication speeds, the maximum common communication speed is identified. Based on the size of the data that needs to be communicated and the maximum common communication speed, a read/write required time is calculated. Based on the access range of the RFID reader/writer and the read/write required time, the maximum transport speed is calculated. When the maximum transport speed is lower than the minimum transport speed at which the sheet can be transported stably, the sheet is stopped.

4 Claims, 17 Drawing Sheets

INFORMATION PROCESSING APPARATUS, METHOD, AND PROGRAM

FIELD OF THE INVENTION

The present invention relates to information processing apparatuses, methods, and programs involving the transport of a sheet having a radio frequency identification (RFID) tag while data is read or written from or into the RFID tag of the sheet.

BACKGROUND ART

Japanese Laid-Open Patent Application Nos. 2005-225043 and 2005-224101 disclose image forming apparatuses in which an image is formed on a sheet having an RFID tag, which is a small device capable of receiving, storing, and transmitting data using a radio wave. FIG. 1 schematically depicts the apparatus of the former publication. An RFID reader/writer 200 is located upstream of a print head 300 along a transport path, which starts with a feeding tray 100. Data is read or written from or into the RFID tag in a region at the RFID reader/writer 200 in which communication between the RFID tag and the RFID reader/writer 200 is enabled (to be hereafter referred to as a "communication-enabled region"). The speed at which the sheet is transported is changed, or the sheet is stopped, to enable the reading or writing of the data.

The RFID reader/writer 200 is disposed preceding the print head 300 because the RFID tag should be read before the sheet is printed by the print head 300. Depending on the orientation of the sheets as they are placed on the feeding tray 100 by a user, the RFID tag, which may be disposed at any of the four corners of the sheet, may be located at the leading end or trailing end of the sheet with respect to the sheet transport direction. When the RFID tag is located at the leading end, the tag reaches the RFID reader/writer 200 before the print head 300, so that the RFID tag can be read before the sheet is printed by the print head 300. However, when the tag is located at the trailing end, the sheet may already be printed by the print head 300 when the RFID tag reaches the RFID reader/writer 200. Because the RFID tag is read using an electromagnetic wave, the RFID reader/writer 200 can read the RFID tag even at some distance. However, the electromagnetic wave used is weak and the operable distance is limited, so that the sheet may be printed a little by the time the reading of the RFID tag is completed.

This publication, i.e., Japanese Laid-Open Patent Application No. 2005-225043, teaches that a fixed speed is set in advance for an adjusted-speed operation in which the sheet transport speed is adjusted (typically reduced), to allow for accessing the RFID tag. However, in this case, if the fixed speed that is set in advance is inappropriate, an error may occur. More specifically, in this image forming apparatus, the speed at which the sheet passes the RFID reader/writer 200 or the duration of time in which the sheet is stopped to enable the reading or writing of the RFID are set such that, to stay on the safe side, more time is provided than is actually minimally required. Thus, the apparatus does not allow the transport speed to be varied depending on the communication speed of the RFID tag on a real-time basis. As a result, the conventional technology is unable to fully reduce the time required for the sheet to pass the RFID reader/writer.

DISCLOSURE OF THE INVENTION

It is therefore a general object of the present invention to overcome the aforementioned problem. A more specific object is to provide an information processing apparatus capable of writing or reading data into or from an RFID tag attached to a sheet, wherein the maximum transport speed at which the reading or writing of the data can be completed is calculated, and the sheet transport speed is reduced or the transport is stopped based on the calculated value, thus eliminating the need for a user to set a transport speed in advance.

In one aspect, the invention provides an information processing apparatus comprising an RFID reader/writer configured to read or write data from or into an RFID portion of an RFID-attached sheet, and a control unit configured to control the speed at which the RFID-attached sheet is transported. The sheet transport speed is varied depending on a read/write communication time required for reading or writing the data from or into the RFID portion of the RFID-attached sheet.

In a preferred embodiment, the read/write communication time required for reading or writing the data is calculated from the size of the data and a communication speed at which the data is communicated between the RFID reader/writer and the RFID portion.

In another embodiment, the communication speed at which the data is communicated between the RFID reader/writer and the RFID portion is determined by comparing one or more communication speeds at which the RFID portion can operate and one or more communication speeds at which the RFID reader/writer can operate, and by selecting a common communication speed between the RFID portion and the RFID reader/writer.

In yet another embodiment, the highest one of plural common communication speeds is selected as the communication speed at which the data is communicated between the RFID portion and the RFID reader/writer.

In yet another embodiment, the maximum transport speed at which the data can be read or written from or into the RFID portion is calculated based on the size of a communication-enabled region that exists along the path of sheet transport, in which region the data can be communicated between the RFID portion and the RFID reader/writer, and based on the read/write communication time. The sheet transport speed is changed to the calculated maximum transport speed.

In yet another embodiment, the sheet transport speed has a lower limit that is the minimum transport speed at which the sheet can be transported stably.

In yet another embodiment, a transport-stop period in which the sheet is stopped is provided when the sheet transport speed needs to be reduced to a speed lower than the minimum transport speed at which the sheet can be stably transported.

In another aspect, the invention provides an information processing method of controlling the speed at which an RFID-attached sheet is transported in an image processing apparatus in which an RFID portion of the RFID-attached sheet is accessed by an RFID reader/writer. The method comprises a first step of comparing one or more communication speeds at which the RFID portion can operate with one or more communication speeds at which the RFID reader/writer can operate, and selecting the maximum communication speed from among common communication speeds between the RFID portion and the RFID reader/writer; a second step of calculating a read/write communication time required for reading or writing the data from or into the RFID portion, based on the size of the data and the maximum communication speed selected in the first step; a third step of calculating the maximum transport speed at which the data can be communicated between the RFID portion and the RFID reader/writer, based on the size of a communication-enabled region that exists along the path of sheet transport, in which region the data can be communicated between the RFID portion and the RFID reader/writer, and based on the read/write communication time calculated in the second step, and transporting the sheet at the maximum transport speed; and a fourth step of providing a transport-stop period in which the transport of the sheet is stopped when the maximum transport speed calculated in the third step is lower than the minimum transport speed at which the sheet can be transported stably.

In another aspect, the invention provides a computer-readable program for causing a computer to carry out the above method.

Thus, in accordance with the present invention, the speed at which an RFID-attached sheet is transported is controlled on a real-time basis based on the time it takes for data to be read or written from or into an RFID portion of the sheet. As a result, the speed at which the RFID-attached sheet can be transported can be maximized automatically and the need for a user to set a transport speed in advance can be eliminated.

BRIEF DESCRIPTION OF THE DRAWINGS

These and other objects, features and advantages of the invention will be apparent to those skilled in the art from the following detailed description of the invention, when read in conjunction with the accompanying drawings in which.

BEST MODE OF CARRYING OUT THE INVENTION

In the following, the present invention is described by way of embodiments with reference made to the drawings.

Figure 1:
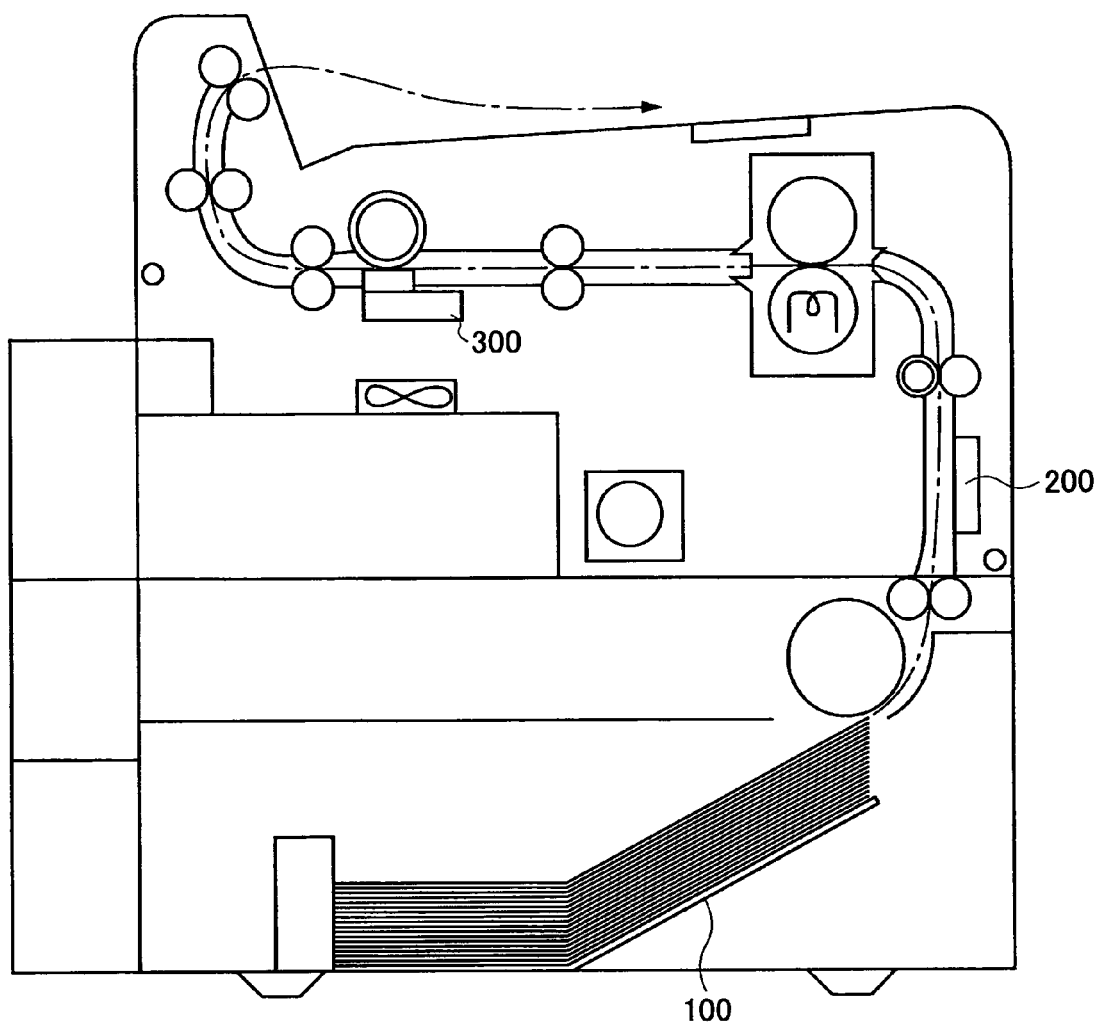
FIG. 1 shows a conventional example of an information processing apparatus.
Figure 2:
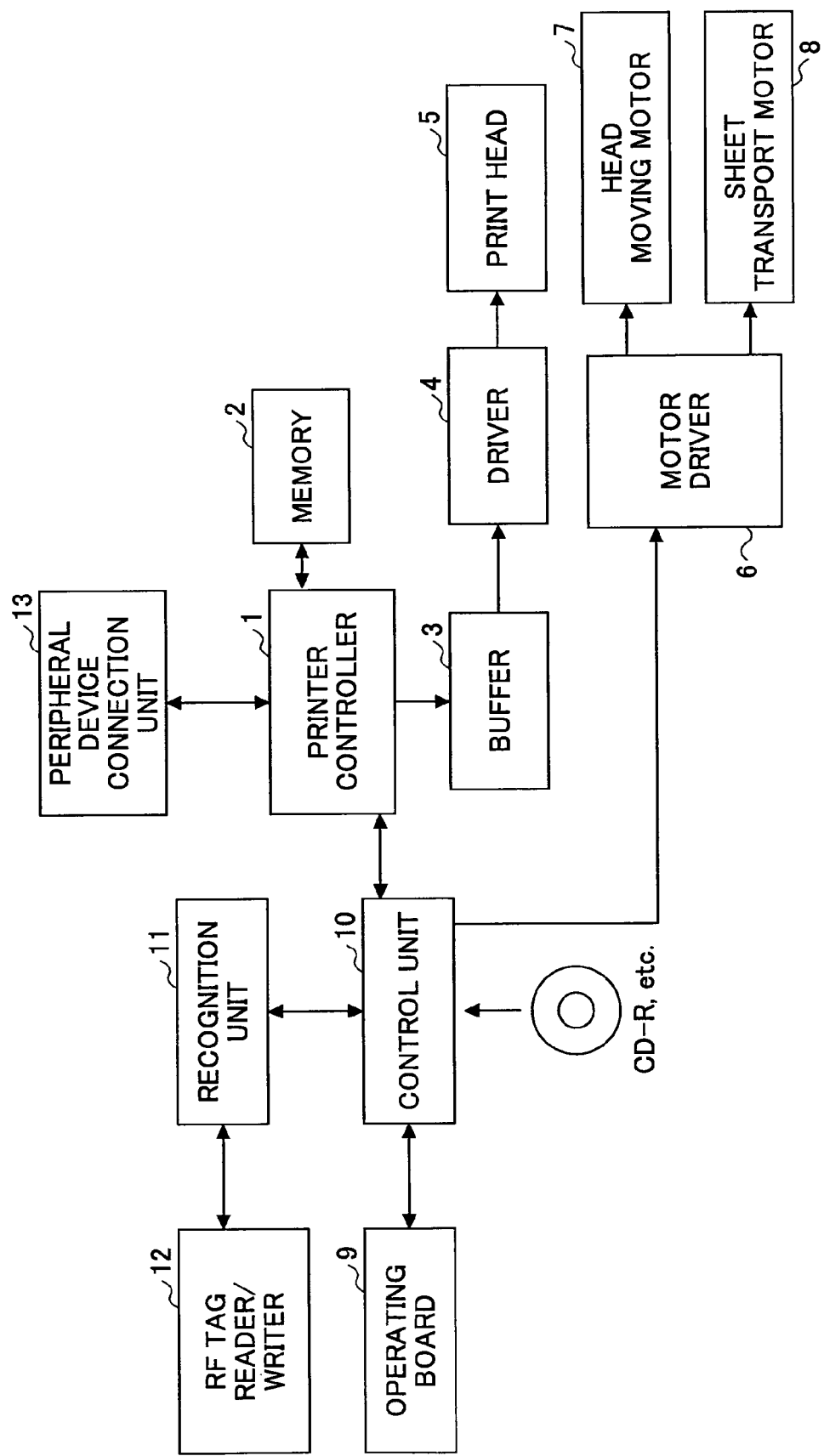
FIG. 2 shows a block diagram of an ink jet printer embodying an information processing apparatus according to the invention.

FIG. 2 shows a block diagram of an ink jet printer as an embodiment of an information processing apparatus according to the invention. The ink jet printer includes an RFID reader/writer 12. A manuscript image (recorded image) may be fed from a network, such as a LAN, through a peripheral device connection unit 13 by USB connection, and stored in a memory 2 through a printer controller 1. The recorded image data is read from the memory 2 and delivered via the printer controller 1, a buffer 3, and a head driver 4 to a print head 5. The print head 5 is driven in accordance with the recorded image data to discharge ink onto a recording sheet. At the same time, a head moving motor 7 and a sheet transport motor 8 are driven in accordance with instructions from a motor driver 6 in order to move the print head 5 such that the manuscript image can be printed as desired. An operator can enter instructions using operating keys arranged on an operating board 9 of the ink jet printer. An information processing program stored in a recording medium, such as a compact disc recordable (CD-R), may be installed on the apparatus.

A control unit 10 controls the display of various items on the operating board 9, reads information entered through key operations on the operating board 9 regarding print conditions and operation conditions of the printer, and sends instructions to various units, including the printer controller 1. The control unit 10 also receives a recognition result from a recognition unit 11, to which the RFID reader/writer 12 is connected. The RFID reader/writer 12 is configured to read or write data from or into an RFID tag attached to the recording sheet, which may be a sheet of paper, on which the manuscript image is recorded. While the RFID tag is herein described as being of a contactless type in the present embodiment, a similar device of contact-type may be used. The recognition unit 11 may recognize the data from the RFID reader/writer 12 and transmit a recognition result to the control unit 10.

Figure 3:
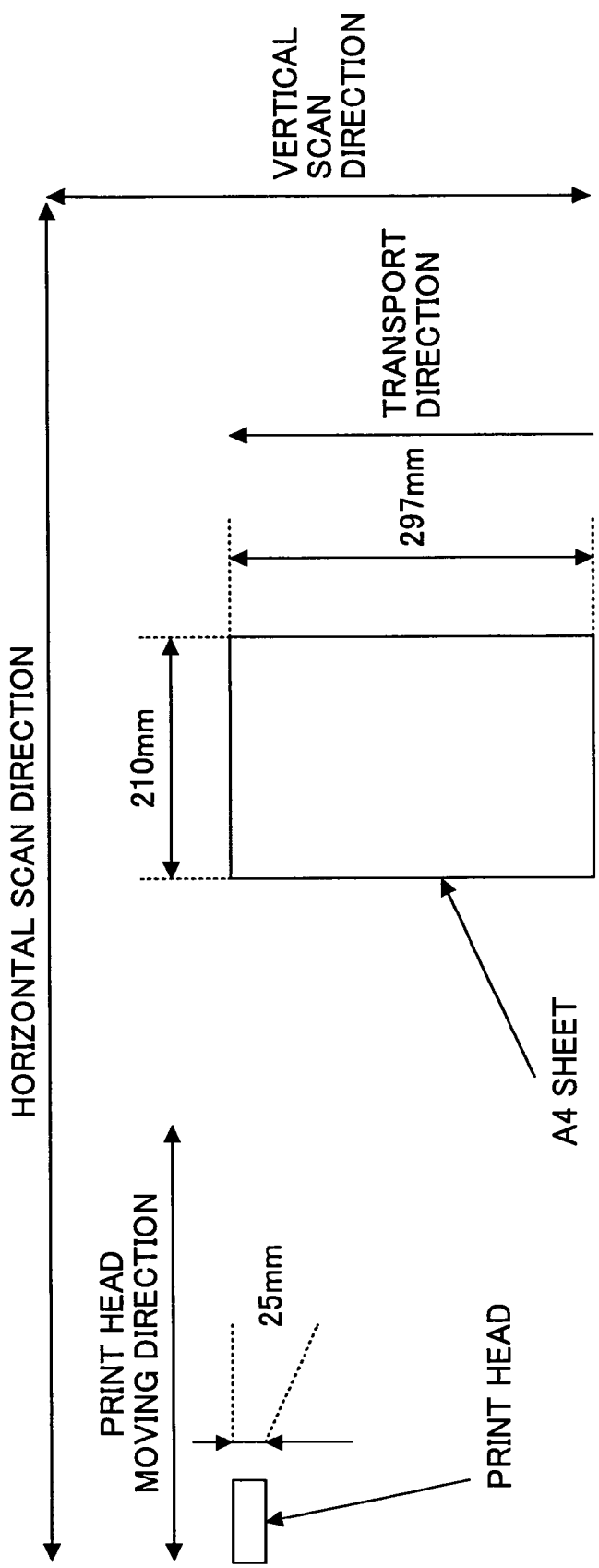
FIG. 3 illustrates a relative positional/directional relationship between a print head and an A4 sheet.

Generally, in a print head scanning-type ink jet printer, an image is formed by scanning a sheet with a print head in a direction perpendicular to the sheet transport direction. FIG. 3 shows a positional/directional relationship between a print head and an A4 sheet. In printer terms, a scan performed in the direction of movement of the print head is referred to as a horizontal scan. A scan performed in a direction perpendicular to the movement of the print head is referred to as a vertical scan. The image formation width in the horizontal scan direction can be increased or decreased by changing the scan distance of the print head. However, the image formation width in the vertical scan direction depends on the physical size of the print head in the vertical scan direction. It is hereafter assumed that the specifications of the print head 5 of the present embodiment are such that its image formation width in the vertical scan direction is 25 mm (or approximately 1 inch).

In order to form an image throughout the length (297 mm) of A4 area by fully utilizing the image formation width (25 mm) in the vertical scan direction, the number of scans necessary is the length of the A4 sheet (297 mm) divided by the image formation width of the read head in the vertical scan direction (25 mm), or 11.88. Thus, by repeating the image formation with the image formation width of 25 mm in the vertical scan direction 11.88 times, the entire area of the A4 sheet can be covered. Rounding up the fractional portion as it cannot be reproduced physically, the actual number of times of scan that is required is 12.

In connection with general print head scanning-type ink jet printers, a term "n-pass" print is used, where n indicates the number of times of passes that are made to complete an image formation in the image formation width of the head in the vertical scan direction. A "one-pass" print means that image data for the image formation width of the print head in the vertical scan direction is printed in one pass, without dividing the data. A "two-pass" print means that the image data for the image formation width of the print head is divided in half, requiring two passes. A "four-pass" print means that the image data is divided into four portions, requiring four passes to cover the image formation width of the print head in the vertical scan direction.

Figure 4:
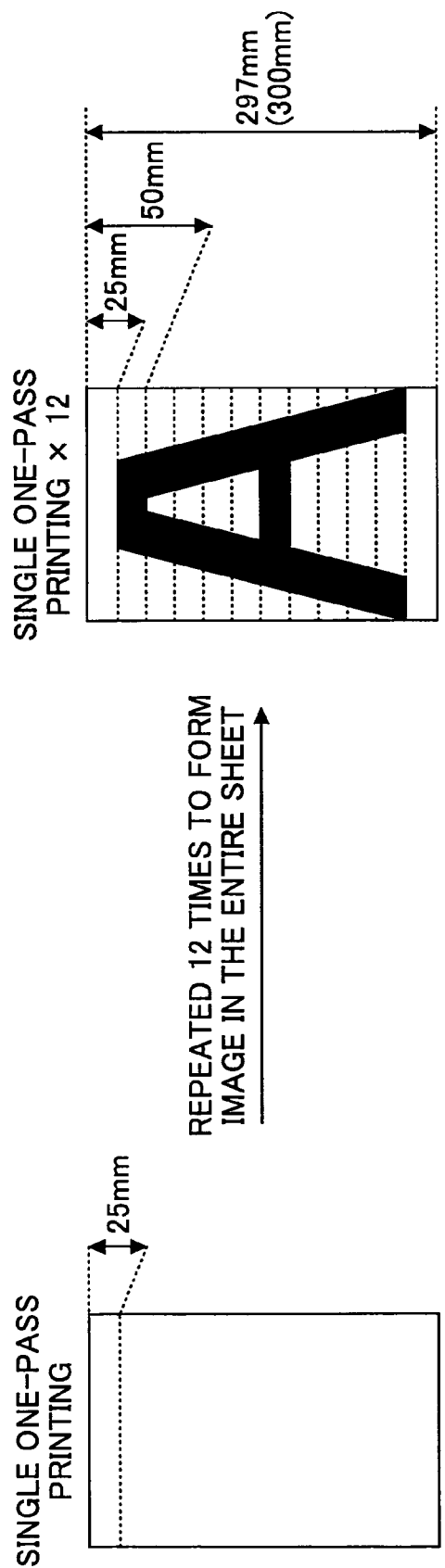
FIG. 4 is a conceptual diagram illustrating how an A4-size image is formed by a one-pass print method.

FIG. 4 shows a conceptual diagram illustrating a case where an A4-sized image formation is conducted with the one-pass print method in accordance with the present embodiment. Because the print head has the image formation width of 25 mm in the vertical scan direction, each one pass with the 25-mm transport distance is repeated 12 times to cover the distance of the length of the A4 sheet, namely 297 mm. Generally, printers have their own performance values in terms of how many sheets can be printed continuously per minute. In the present embodiment, the print head scanning-type ink jet printer is assumed to have an operation mode in which five A4 sheets can be printed per minute.

That five A4 sheets are processed per minute means that the process time per sheet is 12 seconds. When image formation on the sheet is to be completed in 12 passes, each pass can take just one second, including the image formation time required by the print head and the 25-mm transport time. When the ratio of the image formation time to the transport time is 1:1, the allocation for the transport time is 0.5 sec. Thus, the transport speed can be calculated by dividing the transport distance (25 mm) by the transport time (0.5 sec), giving 50 mm/sec.

Figure 5:
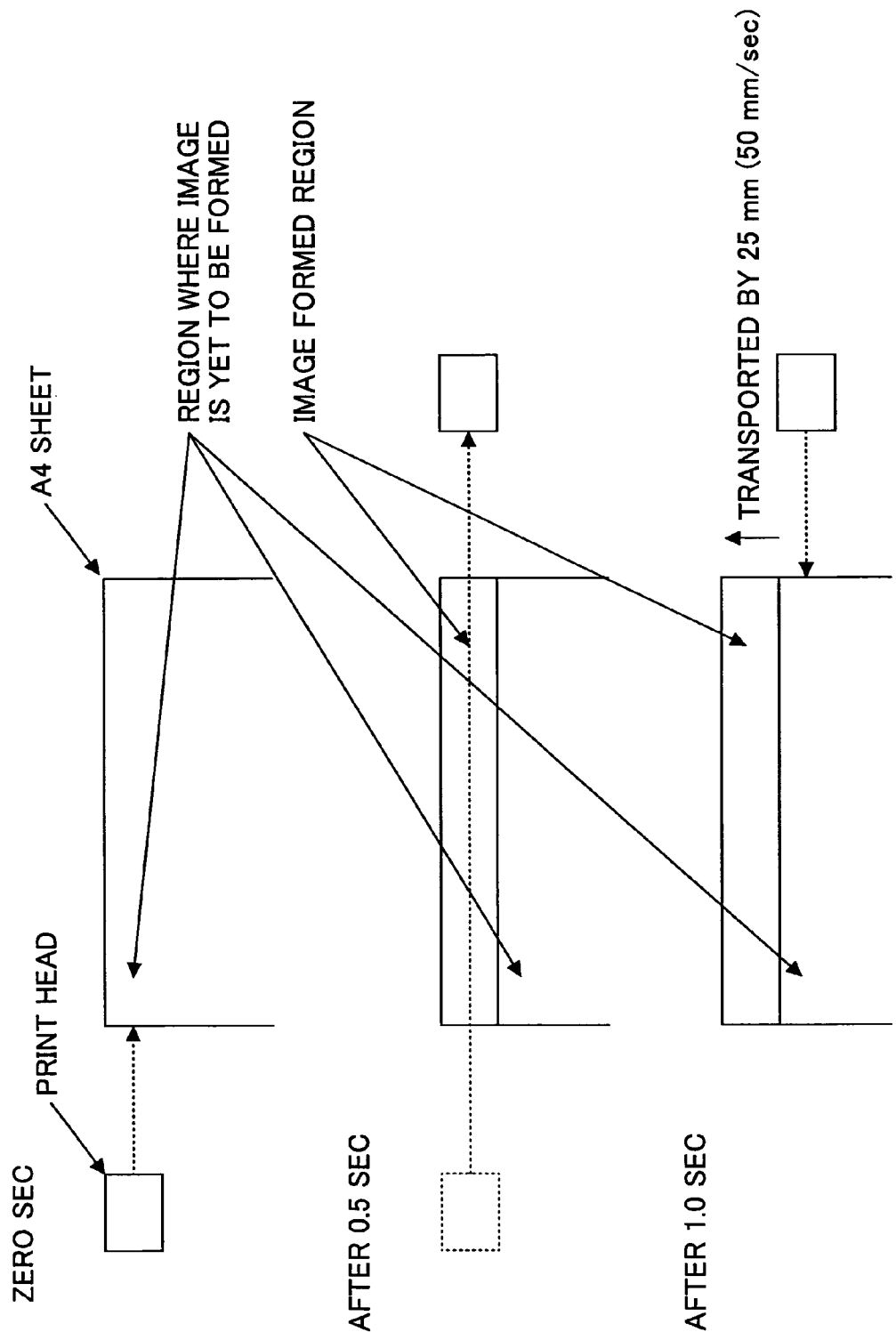
FIG. 5 illustrates a relative positional relationship between a sheet and a print head at different points of time.
Figure 6:
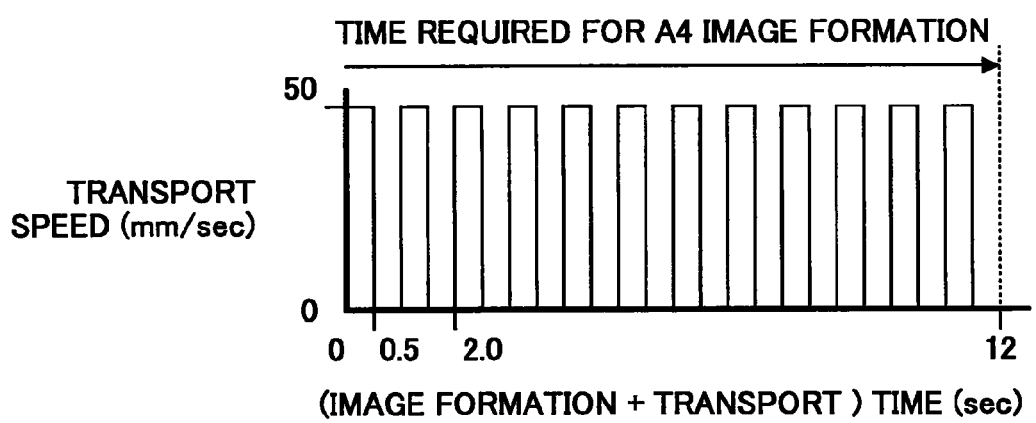
FIG. 6 shows a graph plotting a change in transport speed during a transport speed control.
Figure 7:
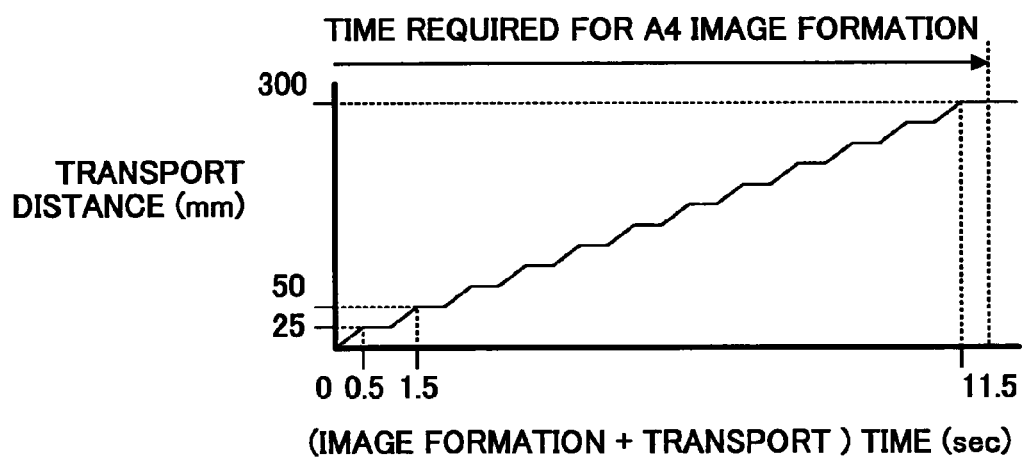
FIG. 7 shows a graph plotting a change in transport distance during a transport speed control.

FIG. 5 illustrates the relative positional relationship between the sheet and the print head at different points of time. When the above A4-size image formation is conducted by repeating the transport of 25 mm in width in one pass at the sheet transport speed of 50 mm/sec, the transport speed control is plotted as shown in FIG. 6. It is noted, however, that an actual apparatus requires an acceleration time to bring the transport speed from 0 mm/sec to 50 mm/sec and a deceleration time to slow the speed from 50 mm/sec down to 0 mm/sec. The present disclosure, however, is based on the assumption that such acceleration/deceleration times are sufficiently small, for the sake of clarity. In accordance with the transport speed graph of FIG. 6, the distance that the sheet is transported is plotted as shown in FIG. 7.

Figure 8:
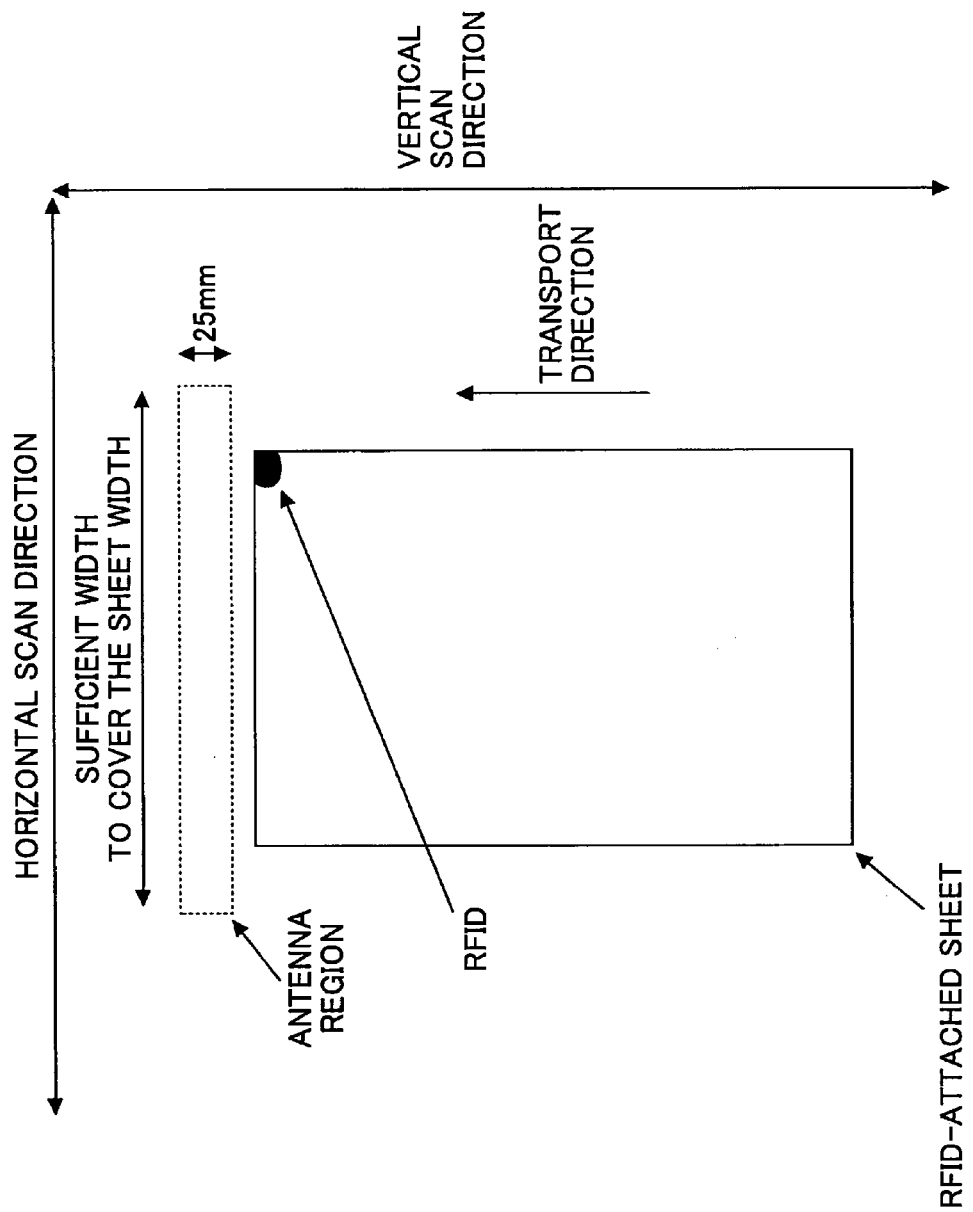
FIG. 8 shows a conceptual diagram illustrating a relationship between an RFID-attached sheet and an antenna region of an RFID reader/writer.

FIG. 8 shows a conceptual diagram illustrating the relationship between the RFID-attached sheet and an antenna region of the RFID reader/writer in which communication between the RFID tag and the RFID reader/writer is enabled ("communication-enabled region"). The apparatus of the present embodiment is designed such that the RFID-attached sheet, as it is transported in the transport direction, passes through the antenna region without fail. In order to satisfy the above conditions, the positional relationship shown in FIG. 8 is defined such that the antenna region of the RFID reader/writer has a width (in the horizontal scan direction) that covers the entire width of the sheet.

The size of the antenna region in the vertical scan direction is equal to the image formation width of the print head, or 25 mm.

Figure 9:
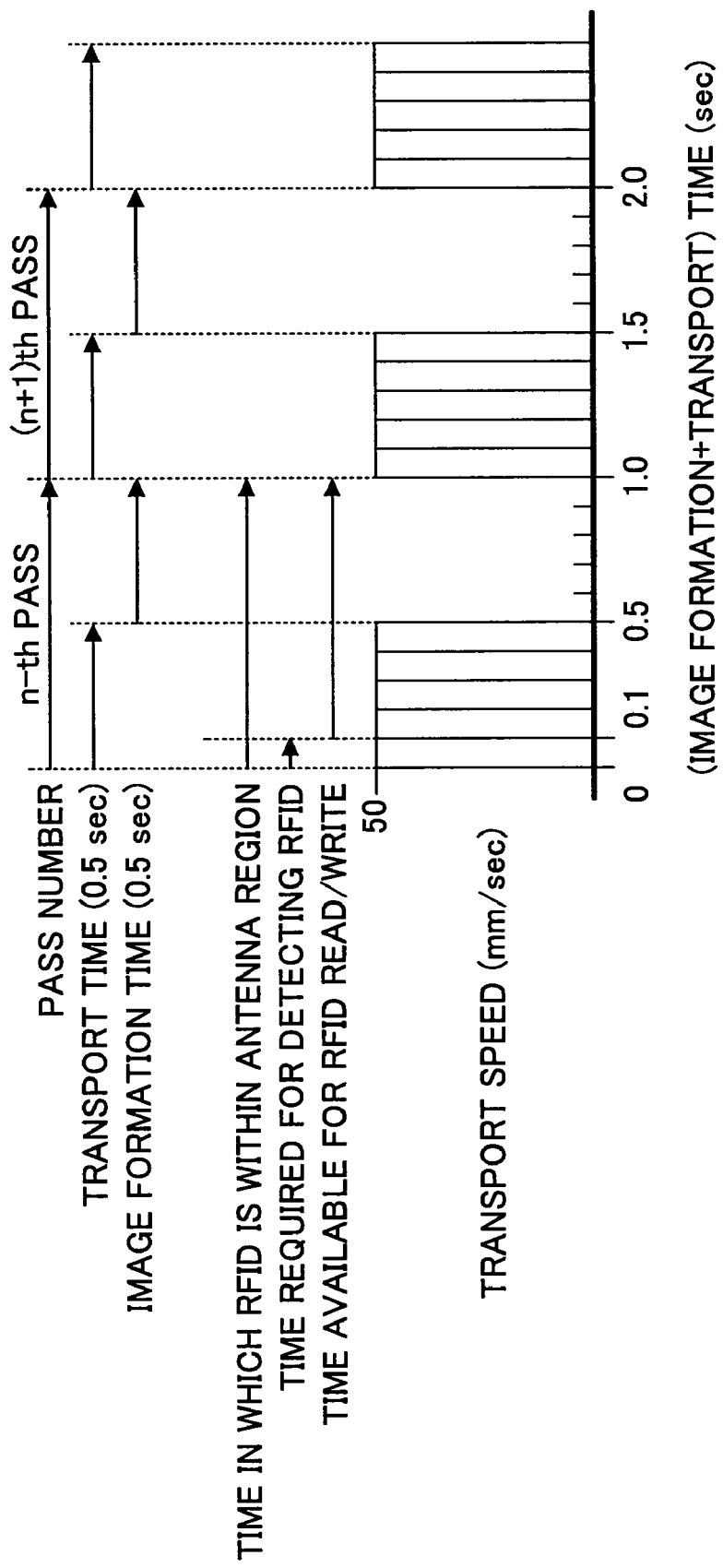
FIG. 9 shows a graph indicating the time in which an RFID tag is within the antenna region.

When the RFID-attached sheet is processed, the ink jet printer needs to check if the RFID tag is in the antenna region. FIG. 9 shows a graph indicating the time when the RFID tag is in the antenna region. Under the aforementioned one-pass print conditions where the antenna region is 25 mm in the vertical direction, the duration of time in which the RFID tag is within the communication-enabled region, i.e., the antenna region, is the same as the time required for a one-pass sequence, or 1 second. However, the information processing apparatus cannot transition to an operation immediately after RFID detection. Specifically, in the example of FIG. 9, the time required for RFID detection is assumed to be 0.1 second, including the time required for activating the detection operation. Thus, the time available for the reading or writing of RFID is the time in which the RFID tag is within the antenna region (1.0 sec) minus the time required for RFID detection (0.1 sec), or 0.9 second.

Figure 10:
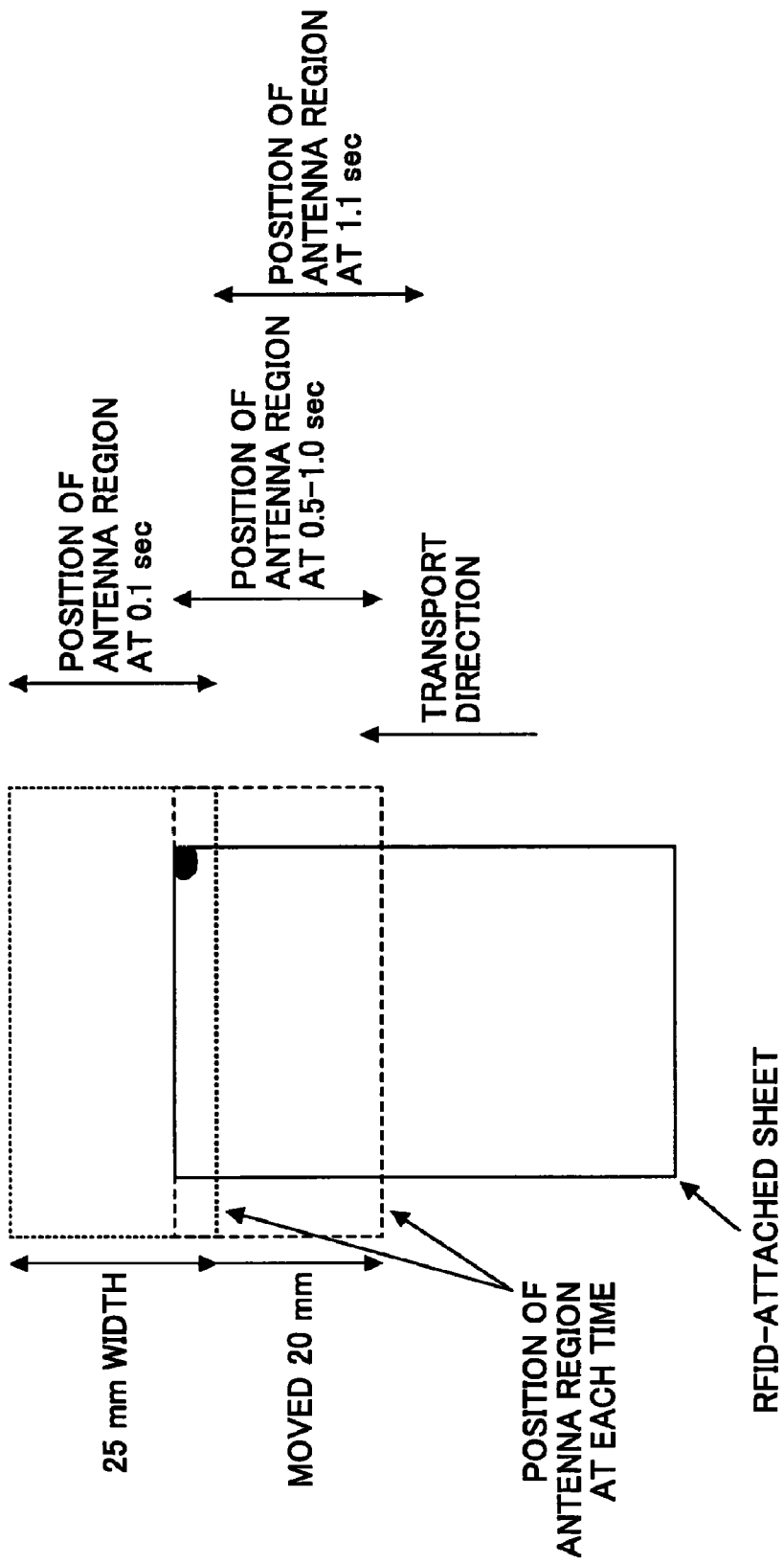
FIG. 10 shows a conceptual diagram illustrating a relationship between an RFID-attached sheet and the antenna region as the sheet is transported.

The time in which the RFID tag is within the antenna region shown in FIG. 9 is physically indicated by the positional relationship between the RFID-attached sheet and the antenna region shown in FIG. 10. FIG. 10 is based on the assumption that the RFID tag has an antenna region that is sufficiently small compared with the antenna region of the RFID reader/writer in the vertical scan direction. For example, under the condition of the transport speed of 50 mm/sec, in a case where detection or non-detection is determined on a 0.1 sec unit basis, the antenna region of the RFID tag needs to be the distance transported in 0.1 sec, namely 5 mm, or smaller.

In a case where the antenna region of the RFID tag is either equal to or greater than the antenna region of the RFID reader/writer in the vertical scan direction, which case is not assumed in the present embodiment, a correction may be required regarding the above conception about the antenna region. In FIG. 10, the RFID tag is detected in the 0-0.1 second interval. At the 0.5 second point, the RFID tag has moved to the limit of the antenna region. After the 1.0 second point, at which the image formation time ends, the RFID tag moves out of the antenna region.

While it has been described with reference to FIG. 10 that the time in which the RFID tag is in the antenna region is the time available for reading or writing the RFID tag, the following steps are taken in the present embodiment without affecting image formation to increase the reliability of the reading or writing of the RFID tag:

(1) The RFID read/write required time is calculated by the information processing apparatus;
(2) The required time is compared with the time available for reading or writing the RFID tag;
(3) If the required time is greater than the available time, the available time is increased;
(4) In order to increase the available time, the transport speed is changed (mainly by deceleration), or the sheet is stopped.

The required RFID read/write time is calculated from the read/write data size and a data communication speed. In accordance with the present embodiment, no distinctions are made between a data read and a data write as regards the required time and data size; instead, both read and write operations are considered to involve the same data communication speed. Actually, there are differences in many cases between a read and a write in terms of data size and data communication speed. Such cases may be accommodated by additional equations. Thus, in the present embodiment, the read/write data size is determined by the amount of information that the information processing apparatus needs to read or write from or into the RFID tag.

In an exceptional case where a read is started with the amount of data within the RFID tag unknown, the read/write data size may be unknown until somewhere in the read process. The read/write data communication speed depends on the performance of an individual RFID tag and reader/writer. Thus, initially, information about communication-enabled standards and speeds is collected from the RFID tag. The information processing apparatus then compares such information with the communication-enabled standards and speeds of the RFID reader/writer.

When it is determined as a result of the above comparison that several communication-enabled standards correspond between the RFID tag and the RFID reader/writer, and that they have upper-limit speed settings alone, a lower upper-limit speed setting is selected, as shown in Table 1 ("R/W" in the following tables denotes the RFID reader/writer.).

TABLE 1

|      | Standard | Speed (kbps) | Selected speed (kbps) |
|------|----------|--------------|-----------------------|
| RFID | A        | ≦10          | 10                    |
| R/W  | A        | ≦15          |                       |

When the comparison shows that several communication-enabled standards correspond and that they have fixed communication-enabled speed settings, the fastest common communication-enabled speed is selected, as shown in Table 2.

TABLE 2

|      | Standard | Speed (kbps) | Selected speed (kbps) |
|------|----------|--------------|-----------------------|
| RFID | B        | 1            | 8                     |
|      |          | 2            |                       |
|      |          | 5            |                       |
|      |          | 8            |                       |
| R/W  | A        | ≦15          |                       |
|      | B        | 1            |                       |
|      |          | 2            |                       |
|      |          | 5            |                       |
|      |          | 8            |                       |
|      |          | 10           |                       |

The read/write data size is determined by the amount of information that the information processing apparatus needs to actually read or write. Thus, it can be considered that the information processing apparatus "knows" the data size required for a read/write process it is about to perform, prior to the start of communication with the RFID tag. Supposing that the data size required for a read or a write is 8 kbit, when the data communication speed of 10 kbps of the first example shown in Table 1 is employed, the read/write required time is the read/write data size (8 kbit) divided by the data communication speed (10 kbps), or 0.8 second. When the time available for the reading or writing of the RFID tag is 0.9 second, which is longer than 0.8 sec, it is determined that there is no need for either a speed change or a transport-stop control.

When the above data size of 8 kbit is communicated at the data communication speed of 8 kbps of the second example shown in Table 2, the read/write required time is similarly calculated by dividing the read/write data size (8 kbit) by the data communication speed (8 kbps), giving 1.0 second. When the time available for the reading or writing of the RFID tag is 0.9 second, because the required time is greater than the available time, it is necessary to perform a transport speed change or a transport-stop control in order to extend the available time by 0.1 second or more.

Figure 11:
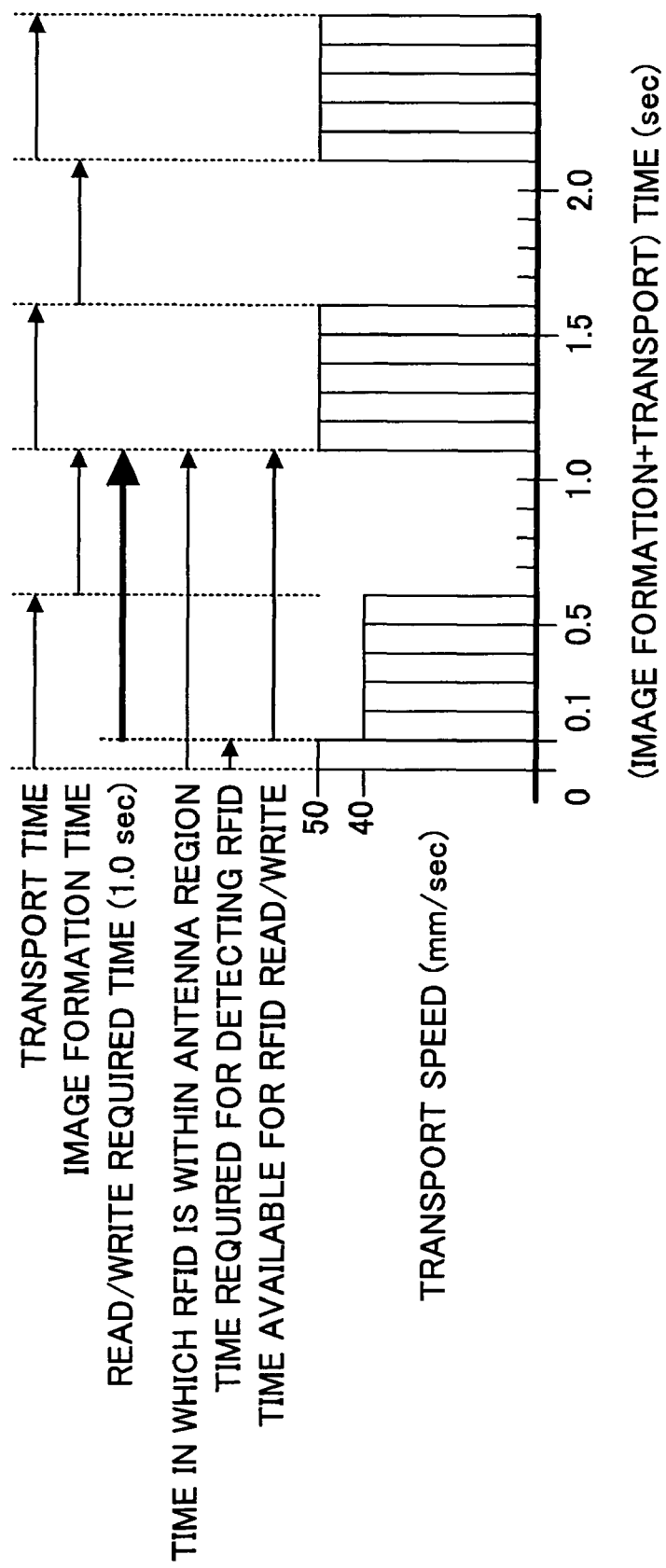
FIG. 11 shows a graph indicating an example of how a read/write available time is extended.

FIG. 11 shows an example in which the sheet transport speed is changed (reduced) to adapt to the read/write required time (1.0 second). Because it is necessary to add the 0.1 second to the read/write available time, the transport speed is reduced from 50 mm/sec to 40 mm/sec.

Figure 12:
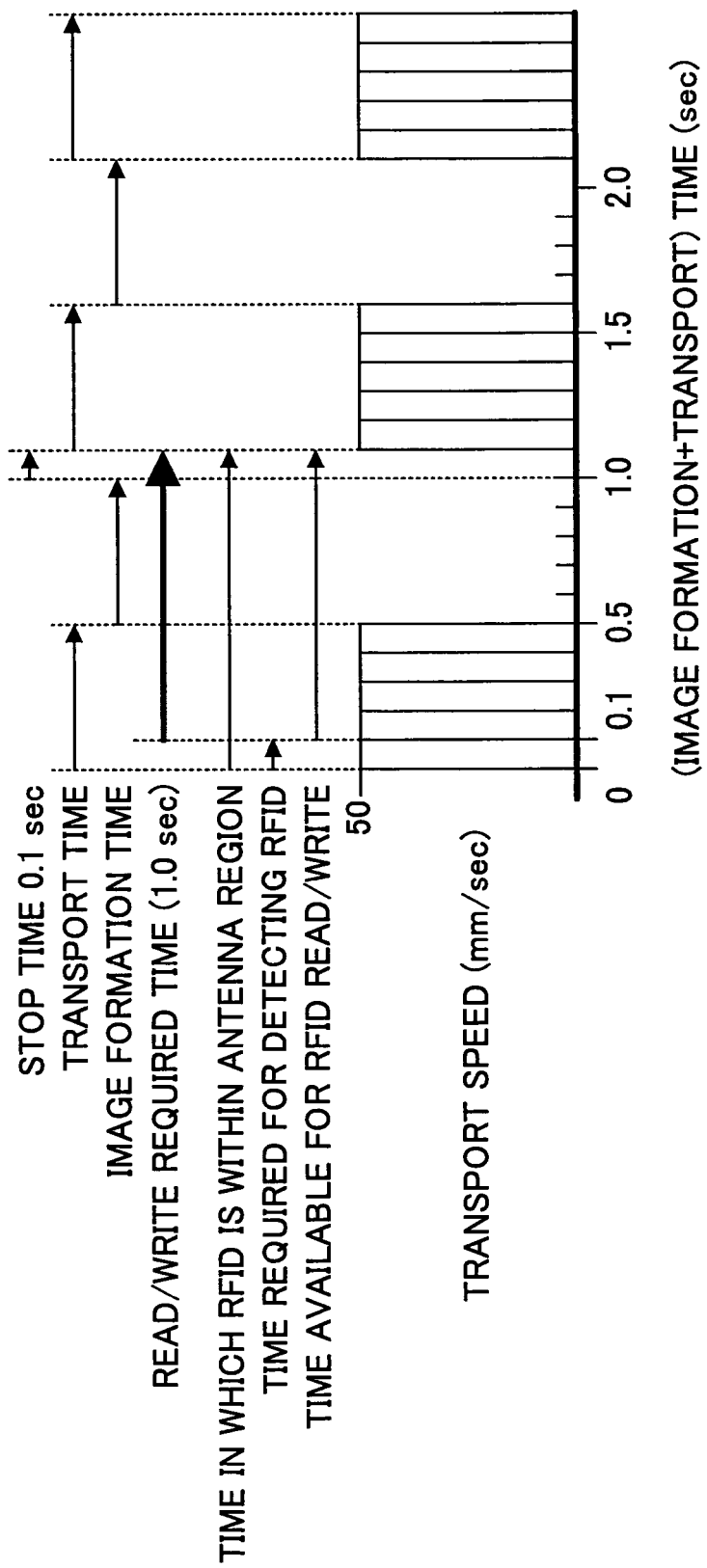
FIG. 12 shows a graph indicating another example of how a read/write available time is extended.

Alternatively, if it is not desirable to change the sheet transport speed too quickly, the stop time in the read/write available time may be increased by 0.1 second as shown in FIG. 12, in order to ensure the read/write required time (1.0 second).

In another example, supposing that the data size required for a read/write is 80 kbit, and that data communication speed is 8 kbps of the second example shown in Table 2, the read/write required time is the read/write data size (80 kbit) divided by the data communication speed (8 kbps), or 10 seconds.

When the time available for reading or writing the RFID tag is 0.9 second, because the required time of 10 seconds is greater than the available time, the transport speed also needs to be either changed or the transport needs to be stopped, in order to extend the available time by 9.1 seconds or more.

In this case, because the detection of the RFID tag requires 0.1 second, the remaining transport time and the remaining transport distance are 0.4 seconds and 20 mm, respectively. If the 9.1 seconds is incorporated into the transport time, the remaining transport time becomes 9.5 seconds (0.4+9.1). However, if the transport is performed in that transport time, it becomes necessary to reduce the transport speed down to 2.1 mm/sec.

The transport speed, however, cannot be decreased indefinitely, although it depends on the drive mechanism used. Decelerating something that is moving at 50 mm/sec down to 2.1 mm/sec means that the thing is almost stopped. Thus, in accordance with the present embodiment, a lower limit value of the transport speed for a speed change is tentatively set at 10 mm/sec.

Figure 13:
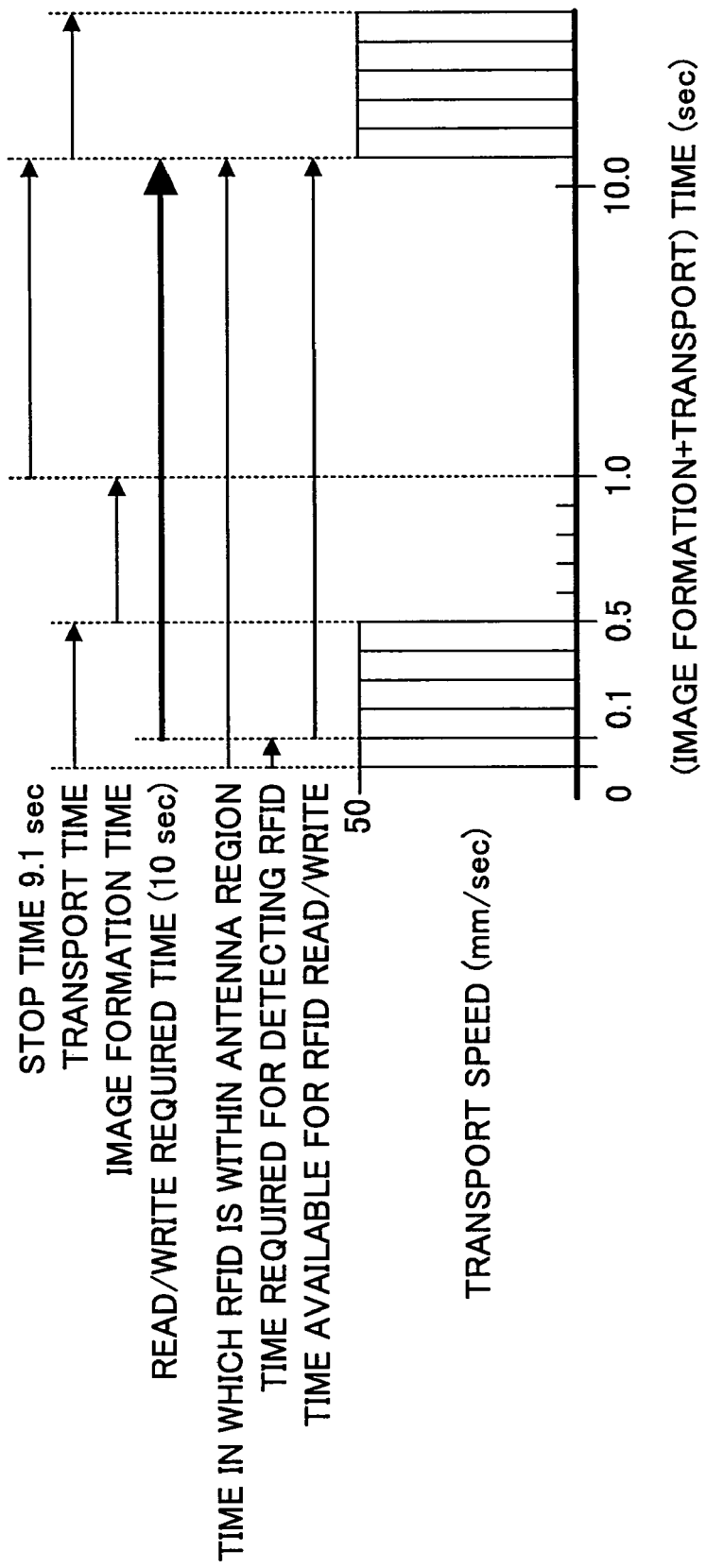
FIG. 13 shows a graph indicating another example of how a read/write available time is extended.

The transport speed of 2.1 mm/sec is smaller than the above lower-limit value (10 mm/sec). Thus, the 9.1 seconds by which the read/write available time is lacking are added as a transport stop period, without changing the transport speed, as shown in FIG. 13.

Figure 14:
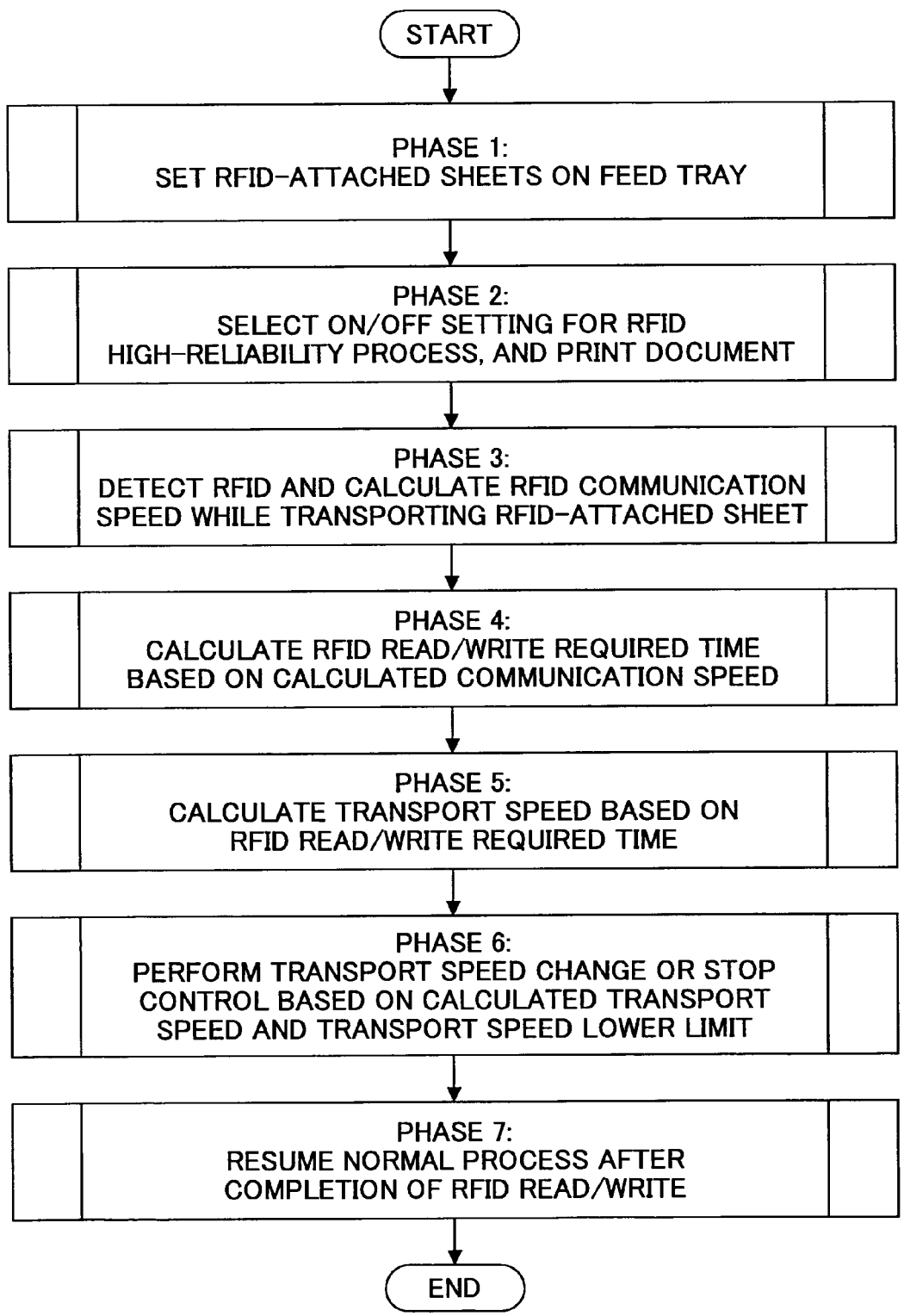
FIG. 14 shows a flowchart of a transport speed control in the information processing apparatus.

In the information processing apparatus of the present embodiment, the transport speed change or the stop control is performed in phases 1 to 7 as shown in FIG. 14. In the initial phase 1, an RFID-attached sheet is set on the paper feeding tray. In phase 2, after selecting an RFID process high-reliability setting, a document printing sequence is started. In phase 3, an RFID communication speed is calculated while the RFID-attached sheet is transported. In phase 4, an RFID read/write required time is calculated from the calculated value of the communication speed. In phase 5, a transport speed is calculated from the RFID read/write required time. In phase 6, based on the calculated transport speed value and the aforementioned transport speed lower-limit, a transport speed change or a transport stop control is executed. In phase 7, a normal process is resumed following the completion of the RFID read/write process.

Figure 15:
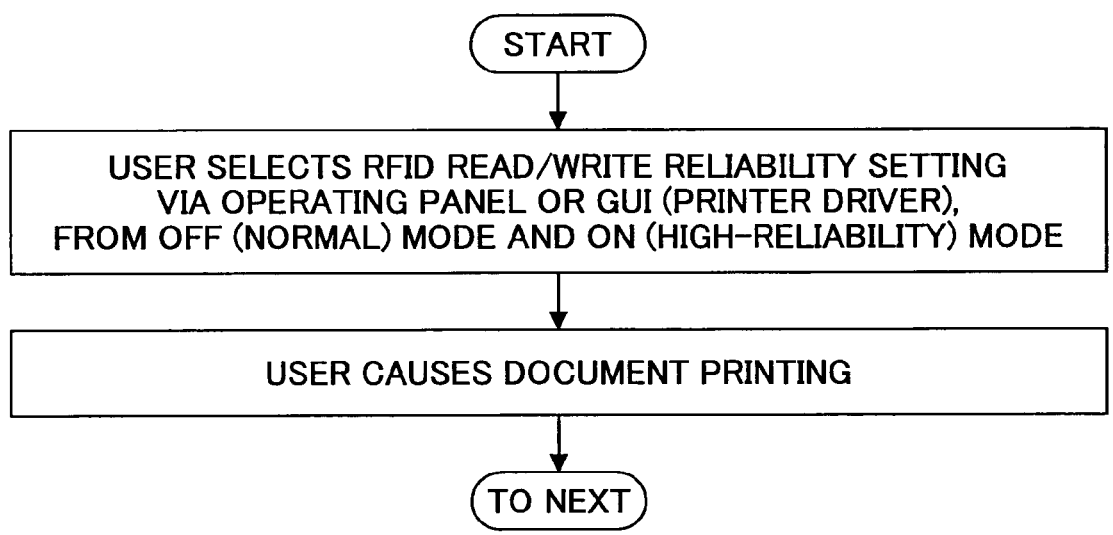
FIG. 15 shows a flowchart of phase 2 of the flowchart of FIG. 14.

FIG. 15 shows a flowchart of phase 2 of the process of FIG. 14. In FIG. 15, the user first operates an operating panel or a graphical user interface (GUI) to select an RFID read/write reliability setting. In the present embodiment, the setting is either OFF (=normal mode) or ON (=high-reliability mode). The user then starts the document printing sequence.

Figure 16:
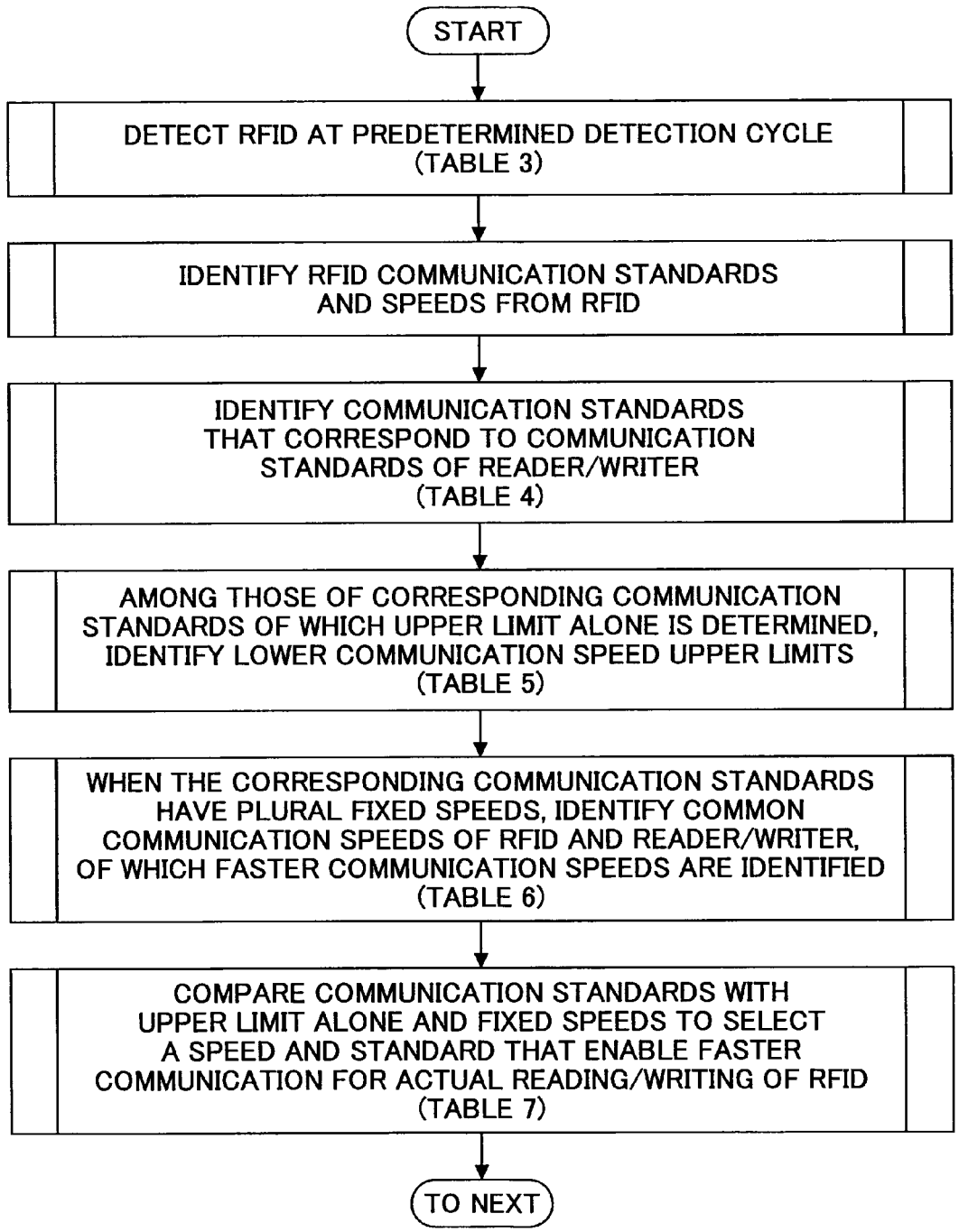
FIG. 16 shows a flowchart of phase 3 of the flowchart of FIG. 14.

FIG. 16 shows a flowchart of phase 3 of the process of FIG. 14. In FIG. 16, initially RFID detection is performed in a predetermined detection cycle. A detection result is obtained as shown in Table 3, in which "specified time" is the time within which RFID should be detected. Upon failure to detect RFID within the specified time, an error process is initiated.

TABLE 3

| Input RFID detection result | | | Output Decision |
|---|---|---|---|
| Detected | Not detected (Within specified time) | Not detected (Exceeding specified time) | |
| 1 | — | — | Next process |
| 0 | 1 | — | Detect again |
| 0 | 0 | 1 | Error |

Then, communication standards and speeds of the RFID tag are identified, and corresponding communication standards between the tag and the RFID reader/writer are identified as shown in Table 4, in which "Error" indicates that it is unable to establish a communication with the RFID tag.

TABLE 4

| Input Communication standards of RFID and R/W | | Output Decision |
|---|---|---|
| Correspond | Do not correspond | |
| 1 | — | To Table 5 |
| 0 | 1 | Error |

Thereafter, when the corresponding communication standards specify upper-limit speeds alone, the communication speed of either the RFID tag or the RFID tag reader/writer with a lower upper-limit is identified, as shown in Table 5.

TABLE 5

| Input Communication speed upper-limits | | | Output Decision Selected upper-limit |
|---|---|---|---|
| RFID = R/W | RFID > R/W | RFID < R/W | |
| 1 | — | — | RFID |
| 0 | 1 | — | R/W |
| 0 | 0 | 1 | RFID |
| 0 | 0 | 0 | Error |

When the corresponding communication standards specify plural fixed speeds, common fixed communication speeds between the RFID tag and the RFID reader/writer are identified, and the fastest common communication speed is identified, as shown in Table 6, in which the fixed speeds are such that speed 1>speed 2>speed 3. The fixed speeds may vary.

TABLE 6

| Input Fixed communication speeds of RFID and R/W (1 = Correspond, 0 = Do not correspond) | | | Output Decision Selected speed |
|---|---|---|---|
| Speed 1 | Speed 2 | Speed 3 | |
| 1 | — | — | Speed 1 |
| 0 | 1 | — | Speed 2 |
| 0 | 0 | 1 | Speed 3 |
| 0 | 0 | 0 | Error |

Then, the common communication standard with the lower upper-limit identified as shown in Table 5 is compared with the communication standard with the highest common fixed speed identified as shown in Table 6, and the standard with a faster communication speed is determined as the communication standard/speed that is used for an actual RFID read/write, as shown in Table 7, in which decisions are made such that, when an error is caused with regard to one of an upper-limit and a fixed speed, the other is selected unconditionally. When both cause an error, an error process is carried out.

TABLE 7

| Input Comparison of selected upper-limit and fixed speed | | | | | Output Decision Selected speed |
|---|---|---|---|---|---|
| Upper limit = fixed speed | Upper limit > fixed speed | Upper limit < fixed speed | Upper limit (error) | Fixed speed (error) | |
| 1 | — | — | 0 | 0 | Upper limit |
| 0 | 1 | — | 0 | 0 | Upper limit |
| 0 | 0 | 1 | 0 | 0 | Fixed speed |
| — | — | — | 1 | 0 | Fixed speed |
| — | — | — | 0 | 1 | Upper limit |
| — | — | — | 1 | 1 | Error |

Figure 17:
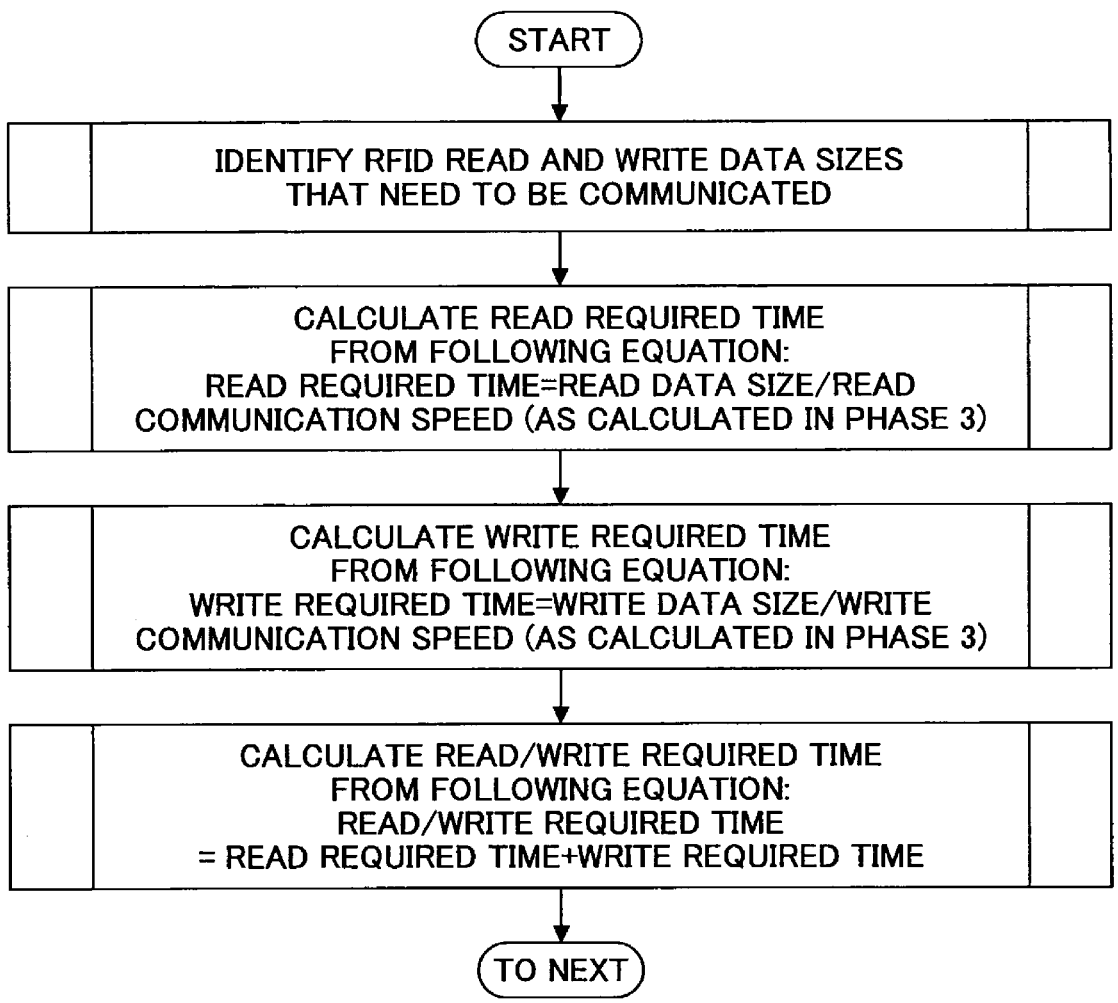
FIG. 17 shows a flowchart of phase 4 of the flowchart of FIG. 14.

FIG. 17 shows a flowchart of phase 4 of FIG. 14. In FIG. 17, the read data size and the write data size that need to be communicated with the RFID tag are initially determined. Then, the read required time is calculated by dividing the read data size by the read communication speed (as calculated in phase 3).

Then, the write required time is calculated by dividing the write data size by the write communication speed (as calculated in phase 3).

Thereafter, the read/write required time is calculated by adding the read required time and the write required time.

Figure 18:
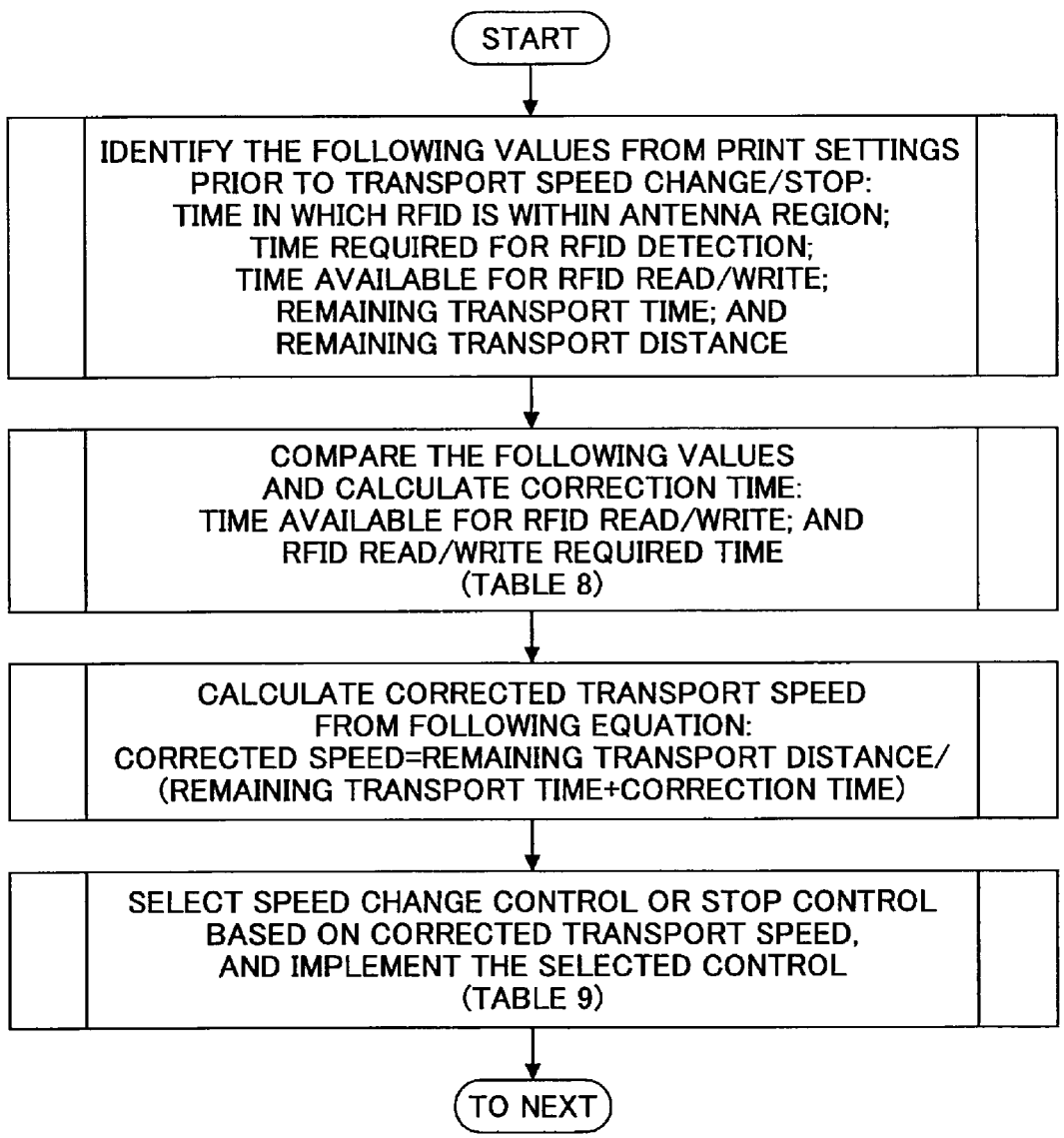
FIG. 18 shows a flowchart of phase 5 of the flowchart of FIG. 14.

FIG. 18 shows a flowchart of phase 5 of FIG. 14. In FIG. 18, the following values are initially confirmed from print settings prior to a transport speed change or a stop control. The values are the time in which the RFID tag is within the antenna region; the time required for RFID detection; the time available for RFID read/write; the remaining transport time; and the remaining transport distance. Then, the time available for RFID read/write and the required RFID read/write time are compared to calculate a correction time. A decision then is made as shown in Table 8.

TABLE 8

| Input | | Output Decision |
|---|---|---|
| Available time ≧ required time | Available time < required time | |
| 1 | — | To phase 7 (Normal process) |
| 0 | 1 | Correct speed with correction time = required time − available time |

Thereafter, a corrected transport speed is calculated by dividing the remaining transport distance by the sum of the remaining transport time and the correction time. It is then determined whether a speed change control or a transport-stop control is required based on the corrected transport speed, and a correction is implemented as needed, as shown in Table 9.

TABLE 9

| Input | | | |
|---|---|---|---|
| Corrected speed ≦ lower-limit | Corrected speed > lower-limit | High-reliability setting (Phase 2) | Output Decision |
| 1 | — | 0 = Off | Stop (Add the correction time of Table 8) |
| 0 | 1 | 0 = Off | Change (With corrected speed) |
| — | — | 1 = On | Stop (Add the correction time of Table 8) |

An information processing program implemented in the information processing apparatus according to the present embodiment may be recorded in a computer-readable recording medium in an installable or executable file format. Examples of the medium are a compact disc read-only memory (CD-ROM), a flexible disc (FD), a compact disc recordable (CD-R), and a Digital Versatile (Video) Disk (DVD).

In another embodiment, such an information processing program may be stored in a computer connected to a network such as the Internet, so that the program can be downloaded via the network. The program may also be stored in a read-only memory (ROM) which may be supplied.

The present application is based on the Japanese Priority Application No. 2007-151942 filed Jun. 7, 2007, the entire contents of which are hereby incorporated by reference.

The invention claimed is:

1. An information processing apparatus, comprising:
  an RFID reader/writer configured to read or write data from or into an RFID portion of an RFID-attached sheet; and
  a control unit configured to control a speed at which the RFID-attached sheet is transported, wherein the sheet transport speed is changed depending on a read/write communication time required for reading or writing the data from or into the RFID portion of the RFID-attached sheet, wherein the control unit is configured to
    compare one or more communication speeds at which the RFID portion can operate with one or more communication speeds at which the RFID reader/writer can operate, and select a maximum communication speed from among common communication speeds between the RFID portion and the RFID reader/writer;
    calculate a read/write communication time required for reading or writing the data from or into the RFID portion from a size of the data and the selected maximum communication speed;
    calculate a maximum transport speed at which the data can be communicated between the RFID portion and the RFID reader/writer, based on a communication-enabled region that exists along the path of sheet transport, in which region the data can be communicated between the RFID portion and the RFID reader/writer, and based on the calculated read/write communication time, and transport the sheet at the maximum transport speed; and
    provide a transport-stop period in which the sheet is stopped when the calculated maximum transport speed is lower than a minimum transport speed at which the sheet can be transported stably.

2. The information processing apparatus according to claim 1, wherein the sheet transport speed has a lower limit that is the minimum transport speed at which the sheet can be transported stably.

3. An information processing method of controlling a speed at which an RFID-attached sheet is transported in an image processing apparatus in which an RFID portion of the RFID-attached sheet is accessed by an RFID reader/writer, the method comprising:
  a first step of comparing one or more communication speeds at which the RFID portion can operate with one or more communication speeds at which the RFID reader/writer can operate, and selecting a maximum communication speed from among common communication speeds between the RFID portion and the RFID reader/writer;
  a second step of calculating a read/write communication time required for reading or writing data from or into the RFID portion from a size of the data and the maximum communication speed selected in the first step;
  a third step of calculating a maximum transport speed at which the data can be communicated between the RFID portion and the RFID reader/writer, based on a communication-enabled region that exists along the path of sheet transport, in which region the data can be communicated between the RFID portion and the RFID reader/writer, and based on the read/write communication time calculated in the second step, and transporting the sheet at the maximum transport speed; and
  a fourth step of providing a transport-stop period in which the sheet is stopped when the maximum transport speed calculated in the third step is lower than a minimum transport speed at which the sheet can be transported stably.

4. A non-transitory computer-readable medium that stores a program for causing a computer to perform an information processing method of controlling a speed at which an RFID-attached sheet is transported in an image processing apparatus in which an RFID portion of the RFID-attached sheet is accessed by an RFID reader/writer, the method comprising:
  a first step of comparing one or more communication speeds at which the RFID portion can operate with one or more communication speeds at which the RFID reader/writer can operate, and selecting a maximum communication speed from among common communication speeds between the RFID portion and the RFID reader/writer;
  a second step of calculating a read/write communication time required for reading or writing data from or into the RFID portion, based on a size of the data and the maximum communication speed selected in the first step;
  a third step of calculating a maximum transport speed at which the data can be communicated between the RFID portion and the RFID reader/writer, based on a communication-enabled region that exists along the path of sheet transport, in which region the data can be communicated between the RFID portion and the RFID reader/writer, and based on the read/write communication time calculated in the second step, and transporting the sheet at the maximum transport speed; and a fourth step of providing a transport-stop period in which the sheet is stopped when the maximum transport speed calculated in the third step is lower than a minimum transport speed at which the sheet can be transported stably.

* * * * *